United States Patent [19]
Levesque

[11] 3,778,121
[45] Dec. 11, 1973

[54] SLIDE GUIDE HAVING PRELOADED HOLLOW AND SOLID ROLLER BEARINGS

[75] Inventor: George N. Levesque, Warwick, R.I.

[73] Assignee: Brown & Sharpe Manufacturing Company, North Kingstown, R.I.

[22] Filed: Nov. 18, 1971

[21] Appl. No.: 199,993

[52] U.S. Cl. .............................. 308/6 R, 308/3 A
[51] Int. Cl. .......................................... F16c 29/00
[58] Field of Search ................ 308/6 R, 3 A, 3.8, 308/215, 184, 189 A, 200, 207 A, 188, 199

[56] References Cited
UNITED STATES PATENTS

| | | | |
|---|---|---|---|
| 3,236,569 | 2/1966 | Moosemann | 308/6 R |
| 3,441,327 | 4/1969 | Peter et al. | 308/217 |
| 3,410,618 | 11/1968 | Harris | 308/215 |

OTHER PUBLICATIONS
Product Engineering – July 19, 1965, T. A. Harris, Preloaded Bearings, pgs. 84–94.

*Primary Examiner*—Charles J. Myhre
*Assistant Examiner*—R. H. Lazarus
*Attorney*—Herbert B. Barlow et al.

[57] ABSTRACT

A machine slide having a support member and a carriage member movable on said support. One of said members having a channel formed in it and the other member having a guide tongue that extends into the channel. Raceways are formed along the inner surfaces of the channel opposite surfaces of the guide tongue. Roller bearings have a portion of their circular surfaces in bearing contact with the raceways and also a portion of their circular surfaces in bearing contact with the wall surfaces of the guide tongue which are opposite the raceways. The roller bearings are comprised of both solid rolls and hollow rolls. The distance between all the opposite surfaces upon which the hollow rolls bear when assembled is less than the diameter of the hollow rolls whereby when the hollow rolls are positioned in place between their opposite bearing surfaces they are compressed between said bearing surfaces to strain them and pre-loaded solid rolls.

7 Claims, 3 Drawing Figures

SLIDE GUIDE HAVING PRELOADED HOLLOW AND SOLID ROLLER BEARINGS

BACKGROUND OF THE INVENTION

The invention relates to a machine slide and more particularly to a novel method and design for preloading roller bearings in a machine slide. Preloading of bearings has been developed for machines when extremely accurate and lasting performance is essential. This includes special machines for the duplication of parts with dimensions of high tolerance, many machine tools, boring mills and most important of all instruments of inspection.

In anti-friction slide mechanisms it is necessary to have very precise control of the pre-load. The reason for this is the great rigidity of the bearings. Only a few tenths of a thousandth difference in fit-up will make a difference from actual looseness to extreme pre-load. One of the prior art constructions is that illustrated by Zwick in U.S. Pat. No. 2,242,498. In his machine slide the high roller stiffness requires that the loading gib be ground to an accuracy of about 50 millionths of an inch. Because of the great difficulty in maintaining proper tolerances in solid gib designs, spring loading has been attempted. However, this has been unsound since the rollers such as seen in the U.S. Pat. of Aller, No. 3,239,939 travel with respect to raceways making it difficult to maintain constant pre-load pressure along the entire raceway. Uniformity of the loading as the slide moves is also very critical in the solid roller designs. In tests run on solid rollers of the Zwick design and having a 5/16 inch diameter and 9/32 inch length it was found that a deformation of only 0.0001 inch causes a roller load of 62 pounds which is already excessive. Testing hollow rolls 0.0012 of an inch larger than the solid rollers and whose wall thickness was 0.025 inches, it was found that a deflection of 0.0012 inches provides 24 pounds of pre-loading spring force per roller. With the hollow roller arrangement it is possible to take advantage of the greater flexibility to allow a total fit-up tolerance of ±.0002 inch which will result in a pre-load change of only ±4 pounds.

SUMMARY OF THE INVENTION

The applicant's invention is a slide guide having a mixture of solid and hollow roller bearings and a novel method of assembling the slide guide. The advantages of pre-loading of a slide mechanism are that higher operating speeds are possible, greacer precision in product dimensions is gained, and longer life at lower cost is possible. The pre-loading produces high stability in a slide because operating loads merely modify the total load, either increasing or decreasing it, in contrast with conventional slides in which the live load changes from no load to full load, and usually with no reversal of load permissible. Actually, from the standpoint of mechanics, pre-loaded slides constitute the introduction of couples into the system which are available to resist other couples such as those due to eccentric loads. If use is made of the deformation of metal (apart from dead load) to produce stability, such use may be called pre-load. Pre-load represents potential energy which can be used to resist working stresses.

The specific structure of the applicant's machine slide comprises a support member and a carriage member movable on the support. A guide channel is formed in one of the members and the other member has a guide tongue that extends into the channel. The guide channel has raceways formed along an area of their surfaces which face the opposing surfaces of the guide tongue. Roller bearings are positioned with a portion of their circular surfaces in bearing contact with the raceways and also a portion of their circular surfaces in bearing contact with the wall surfaces of the guide tongue which are opposite the raceways. The roller bearings are comprised of both solid rolls and hollow rolls. The distance between all the opposite surfaces upon which the hollow rolls bear when assembled is less than the diameter of the hollow rolls whereby when the hollow rolls are positioned in place between their opposite bearing surfaces they are compressed between said bearing surfaces to strain them and pre-loaded solid rolls. The actual method of assembling the roller bearings in the machine slide is accomplished by first placing all solid rolls between the raceways on the channel and their opposite bearing surfaces on said guide tongue. Next the space between the guide channel and the rear surface of one of the raceways which is inserted within the guide is measured and a solid straight gib is ground to the measured dimension. Following this certain solid rolls are removed from specific initial positions and they are replaced by hollow rolls. After this the solid straight gib is inserted in the previously measured space thus straining the hollow rolls a predetermined number of pounds per roller.

It is an object of the invention to provide a roller bearing pre-loading method whereby bearings may be effectively and uniformly pre-loading to suit particular requirements, as compared with prior bearing pre-loading procedures.

It is another object of the invention to provide a pre-loaded machine slide whose number of pounds of pre-load per roller may be controlled within workable machinable limits.

It is a further object of the invention to provide a machine slide having novel roller bearing structure capable of being pre-loaded to within operational limits.

DESCRIPTION OF THE PREFERRED EMBODIMENT

Figure 1:
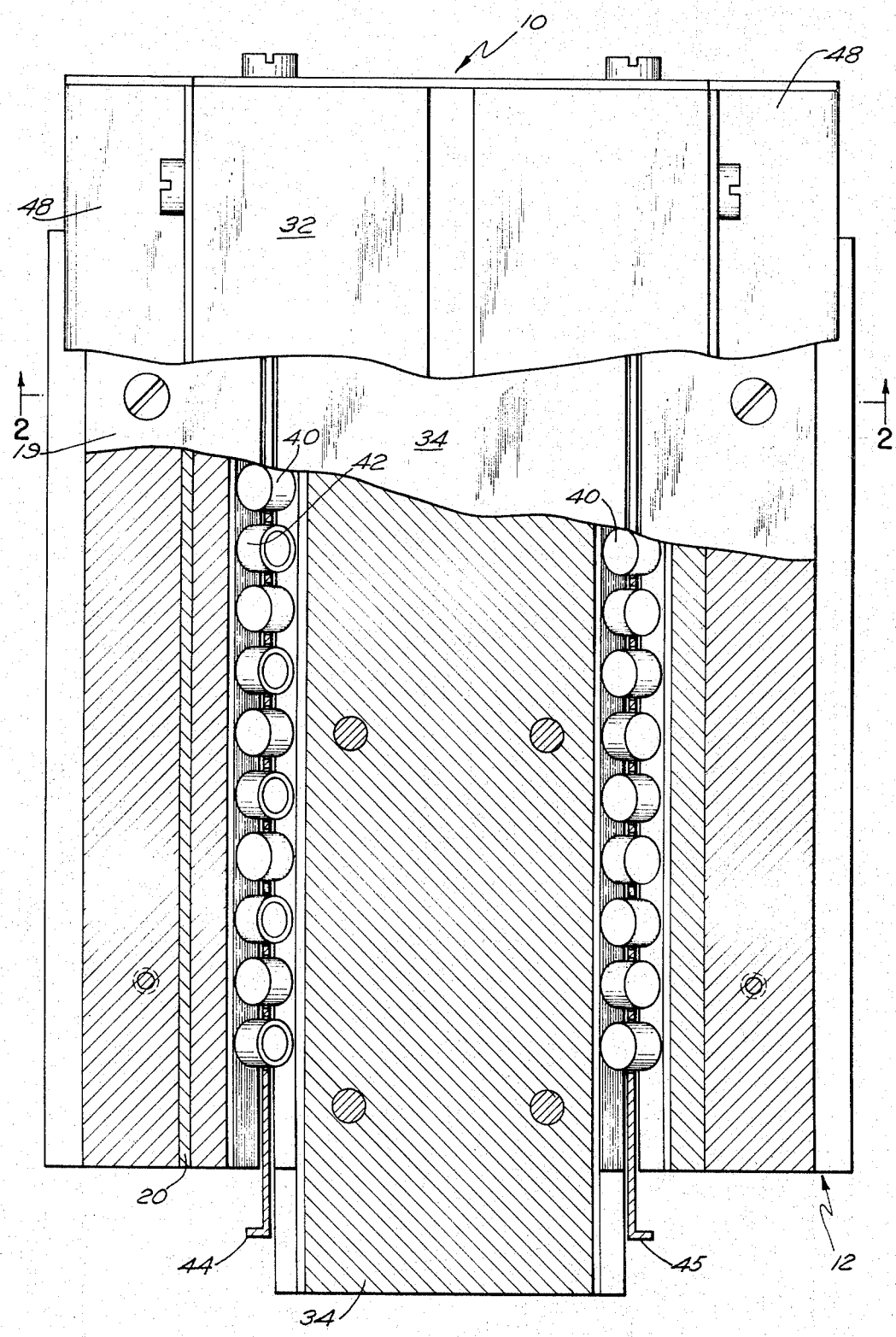
FIG. 1 is a top plan view of the machine slide having portions broken away.
Figure 2:
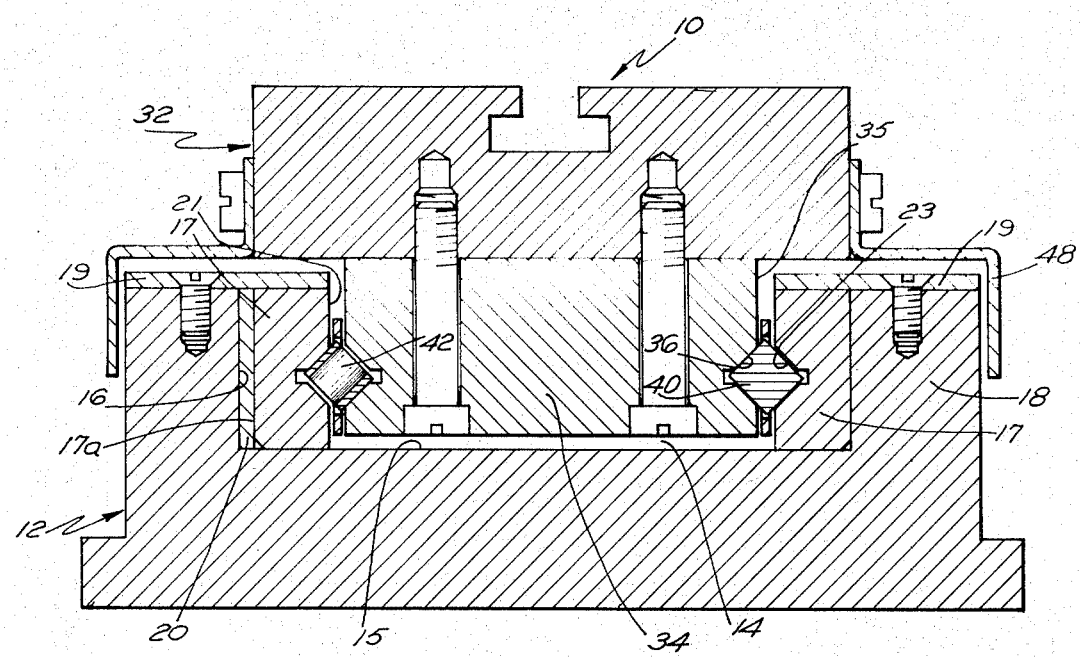
FIG. 2 is a sectional view taken along line 2—2 of FIG. 1.

Referring to the drawings, FIG. 1 illustrates applicant's novel pre-loaded machine slide which is generally designated numeral 10. It is comprised of a support member 12 and a carriage 32 movable longitudinally back and forth thhrealong. As seen in FIG. 2 the support member 12 has a guide channel 14 formed by horizontal surface 15 and the inner vertical surfaces 16 of flanges 18. The guide bars 17 are secured to flanges 18 by plates 19. A solid straight gib 20 is positioned between one of the flanges 18 and its adjacent guide bar 17. The inner vertical surfaces 21 of the guide bars 17 have V-shaped raceways 23 for receiving roller bearings therein. The carriage member 32 has a guide tongue 34 formed along its bottom surface which extends into guide channel 14. The vertical wall surfaces 35 of the guide tongue also have V-shaped raceways 36 formed therein into which the roller bearings ride.

As best seen in FIG. 1 all solid roller bearings are fitted into one of the sets of mating raceways and the other set of mating raceways has an alternate mixture of solid roller bearings 40 and hollow roller bearings 42. Cage bars 44 and 45 extend lengthwise between the respective sets of V-shaped raceways and they have openings in which the individual rollers are placed to keep the rollers properly spaced from each other. It is also seen in FIG. 1 that alternate rollers are tilted in opposite directions. That is, alternate rollers will have their circular peripheries in contact with one of the bearing surfaces of one of the V-shaped raceways, and their flat ends faced toward the other bearing surface of the same raceways, while the intermediate rollers will have their circular peripheries in contact with the second bearing surface of the same V-shaped raceway and their flat ends faced toward the first surface thereof. The rollers 40 and 42 have an axial length slightly less than the diameter of the rollers, so that the flat end surfaces of the rollers are never subjected to bearing pressure, the load being taken entirely by the circular peripheries of the rollers. A dust cover 48 is secured to side walls of the carriage and extend downwardly and outwardly over flanges 18 of the support member to prevent foreign particles from entering the raceways.

A part of applicant's novel machine slide with its roller bearings assembled under a workable pre-load condition resides in its method of assembling the slide. Initially only solid rollers 40 are assembled in the raceways. For convenience all these rollers 40 and the space they fill can be the same size but also the diameters of the rollers 40 in any single row and the spacing of the bearing surfaces on which they roll can be larger or smaller than those in the other rows. At this point the solid straight gib is fitted to the slide assembly by measuring the space between surface 16 of the flange 18 and surface 17a of guide bar 17. The gib is then ground to the measured dimension. Next hollow rollers 42 having a diameter slightly larger than the diameter of the solid rollers 40 they are to replace are substituted for predetermined solid rollers in one of the sets of raceways. When the ground gib is then inserted in its proper space with the hollow rolls in place, a pre-loading of acceptable limits for each hollow roll is obtained.

Figure 3:
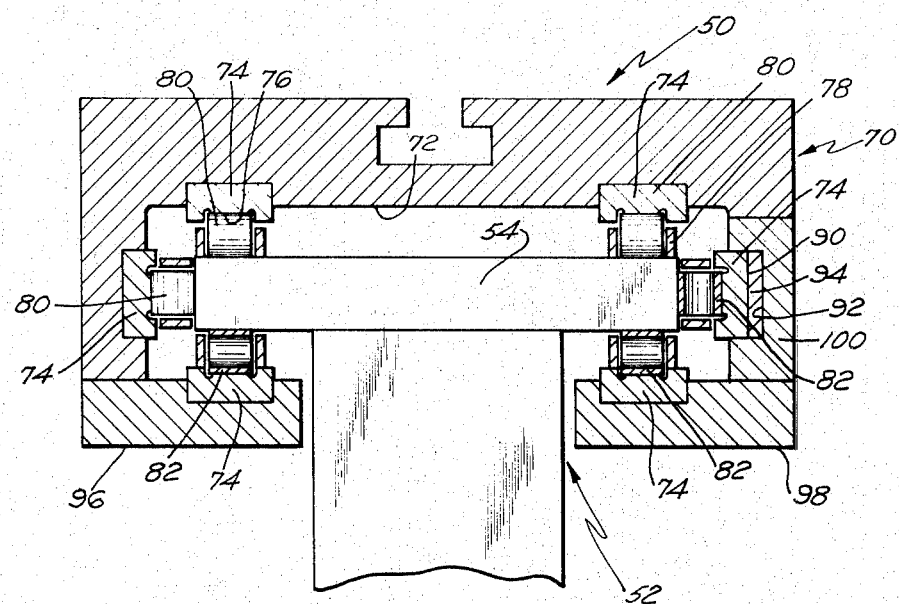
FIG. 3 is a cross section through an alternative embodiment of the machine.

An alternative slide guide embodiment is illustrated in FIG. 3, which is generally designated numeral 50. The support member 52 has a guide tongue 54 and carriage member 70 has a guide channel 72 into which the guide tongue 54 mates. Guide bars 74 are mounted along both the horizontal and vertical inner surfaces of said channel. Each guide bar has a raceway 76 facing inwardly toward a surface of said guide tongue. Mounted within each raceway is a plurality of roller bearings that extend the length of the raceways and which are properly spaced from each other by cages 78. As in the initial machine slide described, one of each opposing sets of roller bearings has only solid rollers 80 in its raceway, while the opposite raceway has only hollow rollers 82. The method of assembling the alternative machine is likewise similar to the method previously described. Only solid rollers are initially placed in the raceways and the space between surface 90 of one of the guide bars and surface 92 along the guide channel 72 is measured. Gib 94 is then ground to the measured dimension and after substituting hollow rollers of a slightly larger diameter for predetermined solid rollers, the gib is assembled in place to place the hollow rollers under a pre-load per roller of workable limits. The strap 96 is fitted to carriage member 70 to provide zero clearance with solid rolls 80 in place of hollow rolls 82 and then the hollow rolls 82 are assembled with the strap 96 bolted to the left side of carriage member 70. Strap 98 is fitted in the same manner as strap 96 and hollow rolls 82 are assembled with strap 98 and side piece 100 fastened by bolts (not shown) to the right side of carriage member 70.

I claim:

1. A slide comprising in combination, a pair of members comprising a support and a carriage movable on said support,
   guide channel means forming a portion of one of said members and guide tongue means forming a portion of said other member, said guide channel means having raceways formed along an area of their surfaces which face the surfaces of said guide tongue means,
   roller bearing means having a portion of their circular surfaces in bearing contact with said raceways and also a portion of their circular surfaces in bearing contact with the wall surfaces of said guide tongue means which are opposite said raceways,
   said roller bearing means comprising both solid rolls and hollow rolls, the distance between all the opposite surfaces upon which the hollow rolls bear when assembled being less than the diameter of the hollow rolls, and said hollow rolls located with respect to the solid rolls so as to pre-load the solid rollers, whereby when the hollow rolls are positioned in place between their opposite bearing surfaces they are compressed between said bearing surfaces to strain the hollow rolls and pre-load the solid rolls.

2. A machine slide as recited in claim 1 wherein said raceways are positioned in sets of two with the individual raceways of each set positioned adjacent opposite faces of said tongue means.

3. A machine slide as recited in claim 2 wherein the individual rolls of said roller bearing means are separated from each other by cages that extend along the length of said raceways.

4. A machine slide as recited in claim 3 wherein in each set of raceways one raceway only has solid rolls positioned therein while the other raceway has hollow rolls positioned therein.

5. A machine slide as recited in claim 4 wherein said raceways in said guide channel means are V-shaped in cross-section and there are also opposed V-shaped raceways in said guide tongue means.

6. A machine slide as recited in claim 5 wherein certain of said rolls are tilted in one direction with their axes in a common plane and the remainder of said rolls being tilted in another direction with their axes a common plane at a substantial angle to the first mentioned plane.

7. A machine slide as recited in claim 4 wherein there are at least three sets of raceways.

* * * * *